Sept. 1, 1925.
C. H. BENNETT
1,551,634
GAS MIXER
Original Filed Sept. 16, 1919
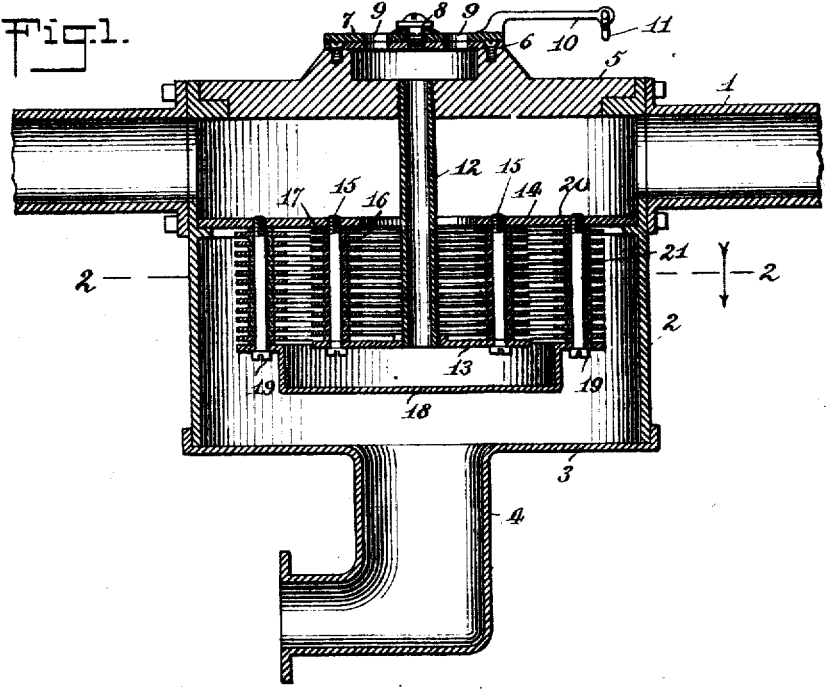
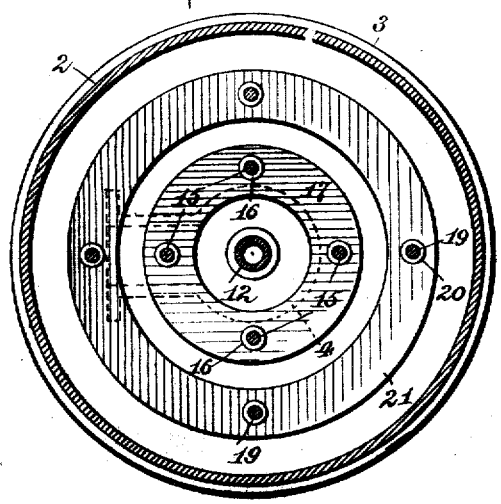
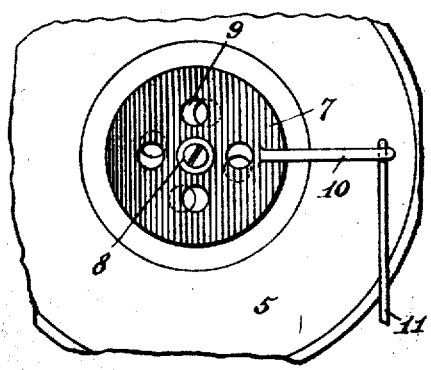
WITNESSES
INVENTOR
Clarence H. Bennett.
BY
ATTORNEYS Patented Sept. 1, 1925.

1,551,634

UNITED STATES PATENT OFFICE.

CLARENCE H. BENNETT, OF JAMESBURG, NEW JERSEY, ASSIGNOR, BY MESNE ASSIGNMENTS, TO BEN-WAT CORPORATION, OF NEW YORK, N. Y., A CORPORATION OF NEW JERSEY.

GAS MIXER.

Application filed September 16, 1919, Serial No. 324,177. Renewed April 2, 1925.

*To all whom it may concern:*

Be it known that I, CLARENCE H. BENNETT, a citizen of the United States, and a resident of Jamesburg, in the county of Middlesex and State of New Jersey, have invented a new and Improved Gas Mixer, of which the following is a full, clear, and exact description.

This invention relates to a gas mixer, and aims to provide an improvement over the structure disclosed in my copending applications Serial No. 286,642, filed April 1, 1919, and No. 293,426, filed May 5, 1919.

The object of this invention is the construction of a gas mixer which will act so as to cause a complete breaking up of the particles of a gaseous mixture and a more intimate comingling of such particles, together with a method of introducing air into the mixture, all of which serves to produce a more efficient operation of the engine with which such gas mixer is employed, also, greater economy.

It has been found heretofore that vaporizers which are positioned between the carburetor and the manifold of an internal-combustion engine produces a more efficient and economical operation. It has also been discovered that an air inlet at this point will produce somewhat the same result.

With the above objects in view, I have in my aforementioned applications constructed vaporizers which more efficiently serve to break the particles of the mixture into a minute state, which vaporizers might also be combined with the means for permitting the introduction of additional air into the mixture at a point between the carburetor and manifold.

I have discovered that to obtain the most efficient result, together with economy, in the somewhat limited space provided between standard types of engines and their carburetors, it is imperative that the space to be occupied by the vaporizer be limited as far as practical, and also that a far more efficient result may be produced in some instances by permitting the fuel to be broken up by a vaporizer, to then permit the introduction of air into such mixture, and to subsequently pass this mixture through a second vaporizer.

With this object in view, I have constructed a vaporizer embodying these aims, and referring to the attached sheet of drawings, which illustrates one practical embodiment of my invention—

Figure 1 is a sectional side view of my improved form of gas mixer;

Fig. 2 is a sectional plan view taken along line 2—2 of Fig. 1; and

Fig. 3 is a top plan view.

In all of these views like reference numerals designate similar parts, and the reference numeral 1 indicates the intake manifold of any motor employing a combustible mixture as its source of power, which connects with a cylindrical casing 2 closed at its ends.

The bottom plate 3 of the casing is provided with a central opening with which there is associated a pipe 4 connecting the casing with any standard type of carburetor.

A top plate 5 serves to close the upper end of the casing 2, such latter plate being centrally provided with an opening the flow of fluid into which may be regulated by any suitable type of valve, as, for instance, one similar to that shown in Figs. 1 and 3, which includes a disk 6 and a second disk 7 rotatably mounted upon the disk 6 by means of a pivot screw 8. Both of the disks are provided with openings 9 which may be moved in or out of alignment by means of a lever 10 associated with the upper disk, which lever 10 is provided with an operating rod 11 conveniently terminating in a dash control.

It will now be noted that it will be possible to permit a greater or lesser flow of fluid into the opening provided in the top plate 5 by moving the rod 11, which will result in a partial or complete closing or complete opening of the passages through the disks.

The space underlying the aforedescribed valve communicates with a tube 12 which terminates in the lower part of the casing, and to the lower end of this tube there is secured a disk 13, a second larger disk 14 encircling the tube 12 above the disk 13 and being spaced therefrom. The disk 14, as will be noted, is ring shape and is spaced from the tube 12, its outer edges contacting, in a fluid-tight seal, with the inner face of the casing 2.

Interposed between the disks 13 and 14 and held fixed by means of bolts, such as 15, there are positioned a number of closely-spaced, parallel flat rings 16. The bolts serve to hold the rings 16 in fixed position and in spaced relationship by passing through their body portions and extending from the disk 13 to 14, and also mounting washers 17 which serve to retain the rings in spaced relationship.

Positioned below the disk 13 and spaced therefrom is a cup-shaped disk 18 which is held fixedly within the casing 2 by means of bolts 19 passing through its edge portions and extending into the disk 14. Similarly mounted upon these bolts there are provided a second set of washers 20 and rings 21, which, as clearly indicated in Fig. 1, are of such diameter as to have their inner edges spaced from the outer edges of the inner set of disks.

Assuming that a carburetor has been connected to the lower end of the pipe 4 and that a motor is connected to the manifold 1, it will be understood in operation that the mixture will enter the inlet opening of the casing through the pipe aforenamed and emerge through the outlet opening provided in the disk 14. The mixture in its flow through the casing will have its imperfectly vaporized fuel particles broken up by the mixer units provided by the series of spaced rings or plates 21 and 16, this breaking action being due first to the well known effect exerted upon the fuel mixture by closely spaced plates and secondly due to the fact that the units have their plates disposed in staggered relation to each other. It will further be noted in this connection that the mixture is free to pass through the outermost mixer unit, incident to the spacing existant between the inner face of the casing and outer edge portions of this unit as well as the parallel disposition of these parts with respect to each other.

As will be well appreciated, the flow of the mixture through the units will produce a partial vacuum in the space between the two sets of rings proportionate to the speed at which the motor is operated and, consequently, the suction which it exerts within the casing 2. A thorough intermingling of the particles of the mixture is now further insured, as well as a still greater saving of fuel, by means of the vacuum above referred to, in the event that the air admission valve is utilized, in that by means of the tube 12, air is introduced at this point, the supply of which is regulated by the valve positioned in the top plate 5, so that not alone is a breaking-up action produced by the rings, but this action is further facilitated by the introduction of a steady stream of fresh air, the mixing of which is insured by means of the second set of rings 16. The completed mixture now passes out through the central opening in the disk 14 and so into the manifold 1, which may take any convenient form and have any connection desired with the casing 2.

Obviously, any number of modifications might well be resorted to without in the least departing from the scope of my invention.

I claim:

1. A mixer including a casing formed with inlet and outlet openings, mixer units arranged around said outlet opening, said mixer units each comprising a series of spaced annular plates, and an imperforate plate secured below the lowermost annular plate and opposite said inlet opening, one of said units being of a smaller circumference than the other of the same, and being arranged within and spaced from said other unit.

2. A mixer including a casing formed with inlet and outlet openings, mixer units arranged around said outlet opening, said mixer units each comprising a series of spaced annular plates, and an imperforate plate secured below the lowermost annular plate and opposite said inlet opening, one of said units being of a smaller circumference than the other of the same, and being arranged within and spaced from said other unit, and a tube extending through the imperforate plate of said inner unit and communicating with the space existing between said units.

3. A mixer including a casing formed with inlet and outlet openings, mixer units arranged around said outlet opening, said mixer units each comprising a series of spaced annular plates, and an imperforate plate secured below the lowermost annular plate and opposite said inlet opening, one of said units being of a smaller circumference than the other of the same, and being arranged within and spaced from said other unit, the plates of the inner unit being arranged in staggered relationship to the plates of the outer unit.

4. A mixer including a plurality of units each comprising a series of annular plates spaced from each other, said units being arranged within each other, and a cup shaped disk secured to the outermost unit and beyond the lowermost plate of the same.

5. A mixer including a casing formed with inlet and outlet openings, and a plurality of fixed mixer units spaced from each other and positioned within said casing around and adjacent to said outlet opening and extending in a direction substantially parallel to the wall of said casing.

CLARENCE H. BENNETT.